United States Patent
Arthur et al.

(10) Patent No.: US 12,182,687 B2
(45) Date of Patent: Dec. 31, 2024

(54) DATA REPRESENTATION FOR DYNAMIC PRECISION IN NEURAL NETWORK CORES

(71) Applicant: INTERNATIONAL BUSINESS MACHINES CORPORATION, Armonk, NY (US)

(72) Inventors: John V. Arthur, Mountain View, CA (US); Andrew S. Cassidy, San Jose, CA (US); Myron D. Flickner, San Jose, CA (US); Pallab Datta, San Jose, CA (US); Hartmut Penner, San Jose, CA (US); Rathinakumar Appuswamy, San Jose, CA (US); Jun Sawada, Austin, TX (US); Dharmendra S. Modha, San Jose, CA (US); Steven K. Esser, San Jose, CA (US); Brian Taba, Cupertino, CA (US); Jennifer Klamo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 687 days.

(21) Appl. No.: 16/157,852

(22) Filed: Oct. 11, 2018

(65) Prior Publication Data
US 2020/0117981 A1 Apr. 16, 2020

(51) Int. Cl.
*G06N 3/063* (2023.01)
*G06N 3/04* (2023.01)

(52) U.S. Cl.
CPC ............... *G06N 3/063* (2013.01); *G06N 3/04* (2013.01)

(58) Field of Classification Search
CPC .. G06N 3/02; G06N 3/04; G06N 3/06; G06N 3/049; G06N 3/063; G06N 3/0454; G06N 3/0481
See application file for complete search history.

(56) References Cited

U.S. PATENT DOCUMENTS

| 10,853,906 B2 * | 12/2020 | Ould-Ahmed-Vall ....... G06N 3/084 |
| 2014/0032465 A1 * | 1/2014 | Modha ............. G06N 3/04 706/27 |

(Continued)

FOREIGN PATENT DOCUMENTS

| CN | 104641385 A | 5/2015 |
| CN | 106127297 A | 11/2016 |

(Continued)

OTHER PUBLICATIONS

Kim, Mijung, and K. Selçuk Candan. "Pushing-down tensor decompositions over unions to promote reuse of materialized decompositions." Joint European Conference on Machine Learning and Knowledge Discovery in Databases. Springer, Berlin, Heidelberg, 2014: 688-704 (Year: 2014).*

(Continued)

*Primary Examiner* — Randall K. Baldwin
(74) *Attorney, Agent, or Firm* — Erik A. Huestis; Katherine L. Baker; Foley Hoag LLP

(57) ABSTRACT

Systems for neural network computation are provided. A neural network processor comprises a plurality of neural cores. The neural network processor has one or more processor precisions per activation. The processor is configured to accept data having a processor feature dimension. A transformation circuit is coupled to the neural network processor, and is adapted to: receive an input data tensor having an input precision per channel at one or more features; transform the input data tensor from the input precision to the processor precision; divide the input data into a plurality of blocks, each block conforming to one of the processor feature dimensions; provide each of the plurality of blocks to one of the plurality of neural cores. The neural network processor is adapted to compute, by the (Continued)

FIG. 4 plurality of neural cores, output of one or more neural network layers.

22 Claims, 6 Drawing Sheets

(56) References Cited

U.S. PATENT DOCUMENTS

| | | | | |
|---|---|---|---|---|
| 2015/0058268 | A1* | 2/2015 | Modha | G06N 3/04 |
| | | | | 706/27 |
| 2016/0155047 | A1 | 6/2016 | Esser et al. | |
| 2017/0316312 | A1* | 11/2017 | Goyal | G06N 3/0454 |
| 2017/0372202 | A1 | 12/2017 | Ginsburg et al. | |
| 2018/0018554 | A1* | 1/2018 | Young | G06N 3/04 |
| 2018/0197084 | A1 | 7/2018 | Kim et al. | |
| 2018/0285254 | A1* | 10/2018 | Baum | G06F 17/10 |
| 2018/0285718 | A1* | 10/2018 | Baum | G06N 20/00 |
| 2018/0300606 | A1* | 10/2018 | Corkery | G06F 3/0631 |
| 2019/0042191 | A1* | 2/2019 | Langhammer | G06F 7/5443 |
| 2019/0205508 | A1* | 7/2019 | Poddar | G06N 3/045 |
| 2019/0286973 | A1* | 9/2019 | Kovvuri | G06F 8/451 |
| 2019/0303749 | A1* | 10/2019 | Appuswamy | G06F 5/01 |
| 2020/0065676 | A1* | 2/2020 | Lo | G06N 20/00 |
| 2020/0097793 | A1* | 3/2020 | Chen | G06F 7/5443 |

FOREIGN PATENT DOCUMENTS

| | | |
|---|---|---|
| CN | 107480770 A | 12/2017 |
| CN | 107633010 A | 1/2018 |
| CN | 107704335 A | 2/2018 |
| CN | 107944556 A | 4/2018 |
| JP | H 4-084358 A | 3/1992 |
| JP | H 6-083796 A | 3/1994 |
| JP | H 6-309293 A | 11/1994 |
| JP | H09128428 A | 5/1997 |
| JP | 2018-142049 A | 9/2018 |
| WO | 2017/168275 A1 | 10/2017 |
| WO | 2018/140294 A1 | 8/2018 |

OTHER PUBLICATIONS

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

Chung, Jaeyong, et al. "Insight: A neuromorphic computing system for evaluation of large neural networks." arXiv preprint arXiv: 1508.01008 (2015): 1-10. (Year: 2015).*

Esser, Steven K., et al. "Convolutional networks for fast, energy-efficient neuromorphic computing." Proceedings of the national academy of sciences 113.41 (2016): 11441-11446. (Year: 2016).*

Sawada, Jun, et al. "Truenorth ecosystem for brain-inspired computing: scalable systems, software, and applications." SC'16: Proceedings of the International Conference for High Performance Computing, Networking, Storage and Analysis. IEEE, 2016: 130-141. (Year: 2016).*

Abadi, Martín, et al. "Tensorflow: Large-scale machine learning on heterogeneous distributed systems." arXiv preprint arXiv: 1603.04467 (2016): 1-19 (Year: 2016).*

Mckinstry, Jeffrey L., et al. "Low precision policy distillation with application to low-power, real-time sensation-cognition-action loop with neuromorphic computing." arXiv preprint arXiv: 1809.09260 (Sep. 2018). (Year: 2018).*

Ji, Yu, et al. "Bridge the gap between neural networks and neuromorphic hardware with a neural network compiler." Proceedings of the Twenty-Third International Conference on Architectural Support for Programming Languages and Operating Systems. Mar. 2018: 448-460. (Year: 2018).*

Cassidy, Andrew S., et al. "Real-time scalable cortical computing at 46 giga-synaptic OPS/watt with 100xspeedup in time-to-solution and 100,000xreduction in energy-to-solution." SC'14: Proceedings of the Internatl Conf. for High Performance Computing, Networking, Storage and Analysis. IEEE 2014: 27-38 (Year: 2014).*

Tsai, Wei-Yu, et al. "LATTE: Low-power audio transform with truenorth ecosystem." 2016 International Joint Conference on Neural Networks (IJCNN). IEEE, 2016: 4270-4277. (Year: 2016).*

Tsai, Wei-Yu, et al. "Always-on speech recognition using truenorth, a reconfigurable, neurosynaptic processor." IEEE Transactions on Computers 66.6 (2016): 996-1007. (Year: 2017).*

Verhelst, Marian, and Bert Moons. "Embedded deep neural network processing: Algorithmic and processor techniques bring deep learning to iot and edge devices." IEEE Solid-State Circuits Magazine 9.4 (2017): 55-65. (Year: 2017).*

Na et al., "Speeding up Convolutional Neural Network Training with Dynamic Precision Scaling and Flexible Multiplier-Accumulator," Proceedings of the 2016 International Symposium on Low Power Electronics and Design, pp. 58-63, ACM, 2016.

International Search Report and Written Opinion for International Application No. PCT/IB2019/058120 dated Dec. 30, 2019.

Translation of Japanese Office Action for Patent Application No. 2021-513308 dated Mar. 1, 2023.

Esser et al., "Convolutional networks for fast, energy-efficient neuromorphic computing." PNAS 113(41) (2016): 11441-11446.

* cited by examiner

DATA REPRESENTATION FOR DYNAMIC PRECISION IN NEURAL NETWORK CORES

BACKGROUND

Embodiments of the present disclosure relate to multi-core hardware implementations of neural networks, and more specifically, to data representation for dynamic precision in neural network cores.

BRIEF SUMMARY

According to embodiments of the present disclosure, methods of and computer program products for operating a neural network are provided. In various embodiments, an input data tensor is received at a neural network processor comprising a plurality of neural cores. The input data tensor has feature dimensions at an input bit precision. The neural network processor is configured for one or more processor feature dimensions at one or more processor bit precisions. The input data is transformed from the input bit precision to one of the processor bit precisions. The input data tensor is divided into a plurality of blocks, each block conforming to one of the processor feature dimensions. Each of the plurality of blocks is provided to one of the plurality of neural cores. The plurality of neural cores computes output of one or more neural network layers.

According to embodiments of the present disclosure, systems for neural network computation are provided. A neural network processor comprises a plurality of neural cores. The neural network processor has one or more processor precisions per activation. The processor is configured to accept data having a processor feature dimension. A transformation circuit is coupled to the neural network processor, and is adapted to: receive an input data tensor having an input precision per channel at one or more features; transform the input data tensor from the input precision to the processor precision; divide the input data into a plurality of blocks, each block conforming to one of the processor feature dimensions; provide each of the plurality of blocks to one of the plurality of neural cores. The neural network processor is adapted to compute, by the plurality of neural cores, output of one or more neural network layers.

DETAILED DESCRIPTION

Figure 1:
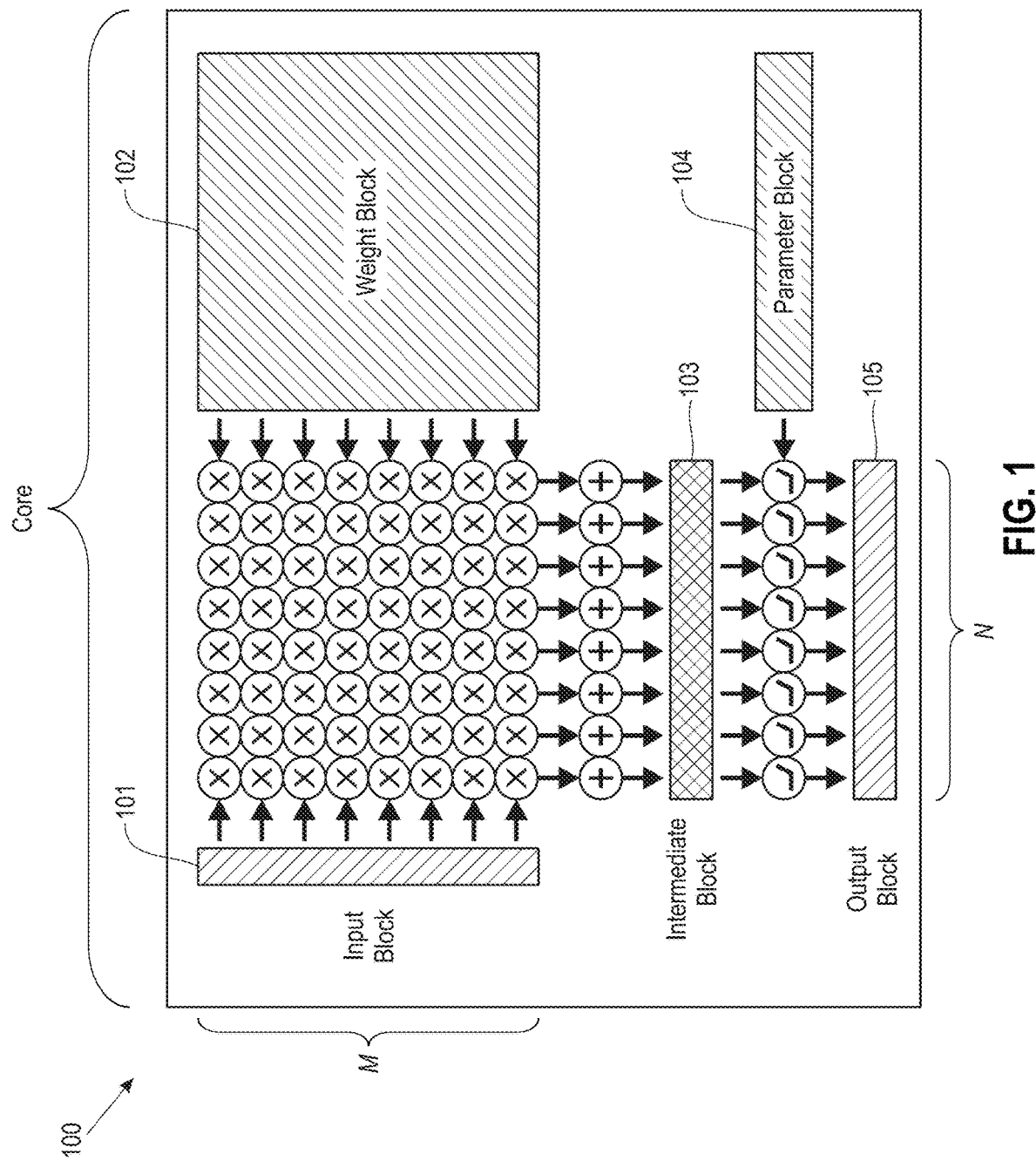
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions σ in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function σ.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \qquad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \qquad \text{Equation 2}$$

For simplicity of notation, the weighted sum in Equation 2 may be referred to as the output, which is equivalent to using a linear activation function $Y[i,j,k]=\sigma(Z[i,j,k])=Z[i,j,k]$, with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

A convolution layer exploits spatially local correlations in natural sensor data by enforcing a local connectivity pattern between neurons in adjacent layers: each neuron receives connections from only a small region of the input data tensor. The extent of this connectivity is called the receptive field of the neuron. All neurons that compute elements of the same output feature share the same set of weights and activation function parameters, called a filter, with a local receptive field. The size of a filter is fixed, irrespective of input size, so a convolution layer has far fewer free parameters than a fully connected layer with the same input and output dimensions, and a correspondingly smaller memory footprint.

For example, in a spatial convolution layer, each filter's receptive field covers only a fraction of the height and width of the input data tensor, but extends through the full feature depth. Such an architecture ensures that the filters produce the strongest response to a spatially local input pattern. The layer computes its output by convolving each filter across the width and height of the input data tensor, computing the dot product between the entries of the filter and the input data tensor at each location to produce a 2-dimensional activation map for each filter.

Stacking the feature maps for all filters forms the full output data tensor for the convolution layer. Every element in the output data tensor can thus also be interpreted as an output of a neuron that looks at a small region in the input and shares filter parameters with neurons in the same output feature map.

It will be appreciated that the size of a convolution layer's output data tensor is a function of the size of the input data tensor, the size of the filters, and the stride with which the filters are applied to the input data tensor. The stride parameters stride_a, stride_b, and stride_c define the distance between each filter application, a value of 1 signifying that each filter application is shifted one pixel along the relevant dimension of the input data tensor. Larger stride values reduce the computational load by computing only a subset of the possible output pixels.

It will further be appreciated that in various convolutions, zero padding may be applied to the input data tensor in order to vary the output data tensor size relative to the input data tensor size, for example to make those sizes equal. Padding may be omitted in various examples for simplicity of explanation, but it will be apparent that padding may be included in various embodiments without departing from the scope of the present disclosure.

In a convolution layer, the 6-dimensional weight tensor contains many repeated blocks, since all elements of the same output feature share the same filter weights that are replicated at each output location. The shared filter weights can be described more compactly by a dense 4-dimensional filter tensor F that contains all of the filters that compute output features of the layer, and is indexed by the output feature dimension (output feature k) and 3 filter input dimensions (filter row r, filter column s, filter feature t).

$$Z[i, j, k] = \sum_{r=1}^{R}\sum_{s=1}^{S}\sum_{t=1}^{T} F[k, r, s, t] \cdot X[\alpha(i, r; A), \beta(j, s; B), \gamma(r, t; \Gamma)] \quad \text{Equation 3}$$

In Equation 3, the range of the r, s, t summations may be reduced for i,j,k coordinates near the edges of the output data tensor to accommodate boundary conditions, which are omitted here for simplicity. The accessor function $\alpha(i, r; A)$ computes the row coordinate $\alpha$ of the input data tensor element to be multiplied by filter weight F [k, r, s, t] in order to compute output data element Y[i,j,k], where A is a set of constants that parameterize the row coordinate calculation, such as striding parameter stride_a and padding parameter pad_a. Analogous accessor functions $\beta(j, s; B)$ and $\gamma(r, t; r)$ compute the column and feature coordinates b and c.

In various embodiments, convolution as described above is decomposed into smaller problems. Each problem may then be solved on one or more neuromorphic core or on one or more core of a conventional multicore system in parallel.

In some embodiments, the input data tensor is decomposed along its row and column dimensions into blocks that extend the entire length of its feature dimension. In such embodiments, a neural core receives an input data tensor block and the whole filter tensor F. To correctly compute convolutions for pixels at boundaries of the input data tensor blocks, input data tensor blocks may be generated such that they overlap. Alternatively, partial sums from multiple neural cores may be summed together to arrive at a final result.

Neural Networks are useful for a variety of tasks, such as image classification. Low precision and/or constrained neural network hardware accelerators can implement such tasks using fewer bits of precision for neuron activations (values sent between layers) and parameters (such as neuron-to-neuron weights) compared to conventional computers (e.g., CPUs and GPUs). This saves silicon area as well as compute energy without sacrificing task performance (such as classification accuracy).

However, reduced precision substrates face challenges such as transformation of inputs, which may be high precision, into a compatible low-precision representation. Such low-precision representations may require specific formats, such as vectors of inputs rather than scalars. In addition, hardware precision is fixed is fabrication time, yet different neural networks and different layers within a single neural network may benefit from varied levels of precision.

To address these and other shortcomings of alternative approaches, the present disclosure provides systems and methods enabling a low-precision hardware neural network substrate to receive high-precision data in various formats, transduce it into a compatible low-precision vector representation, and implement flexible-precision computations.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input data tensor block 101 with an M×N weight tensor block 102 and accumulates the products into weighted sums that are stored in a 1×N intermediate tensor block 103. A O×N parameter tensor block 104 contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
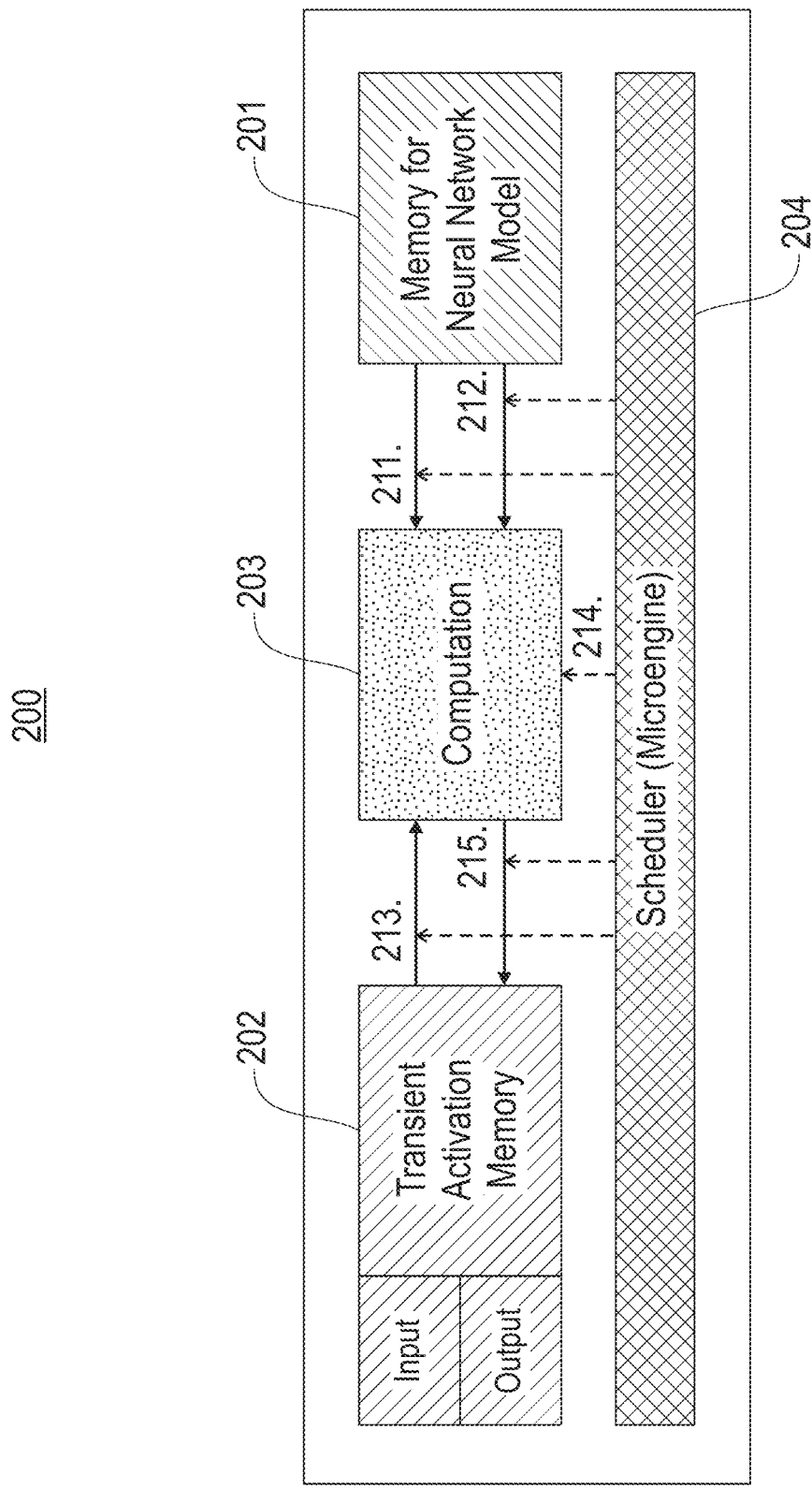
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a scheduler 204 is included in IPU 200. In such embodiments, all operations in the IPU are directed (211 . . . 215) by the scheduler. As set out below, central and/or distributed schedulers may be provided in various embodiments. A global scheduler may be referred to as a chip microengine, while a local scheduler may be referred to as a core microengine or local controller. In various embodiments a scheduler comprises one or more microengines, microcontrollers, state machines, CPUs, or other controllers.

Figure 3:
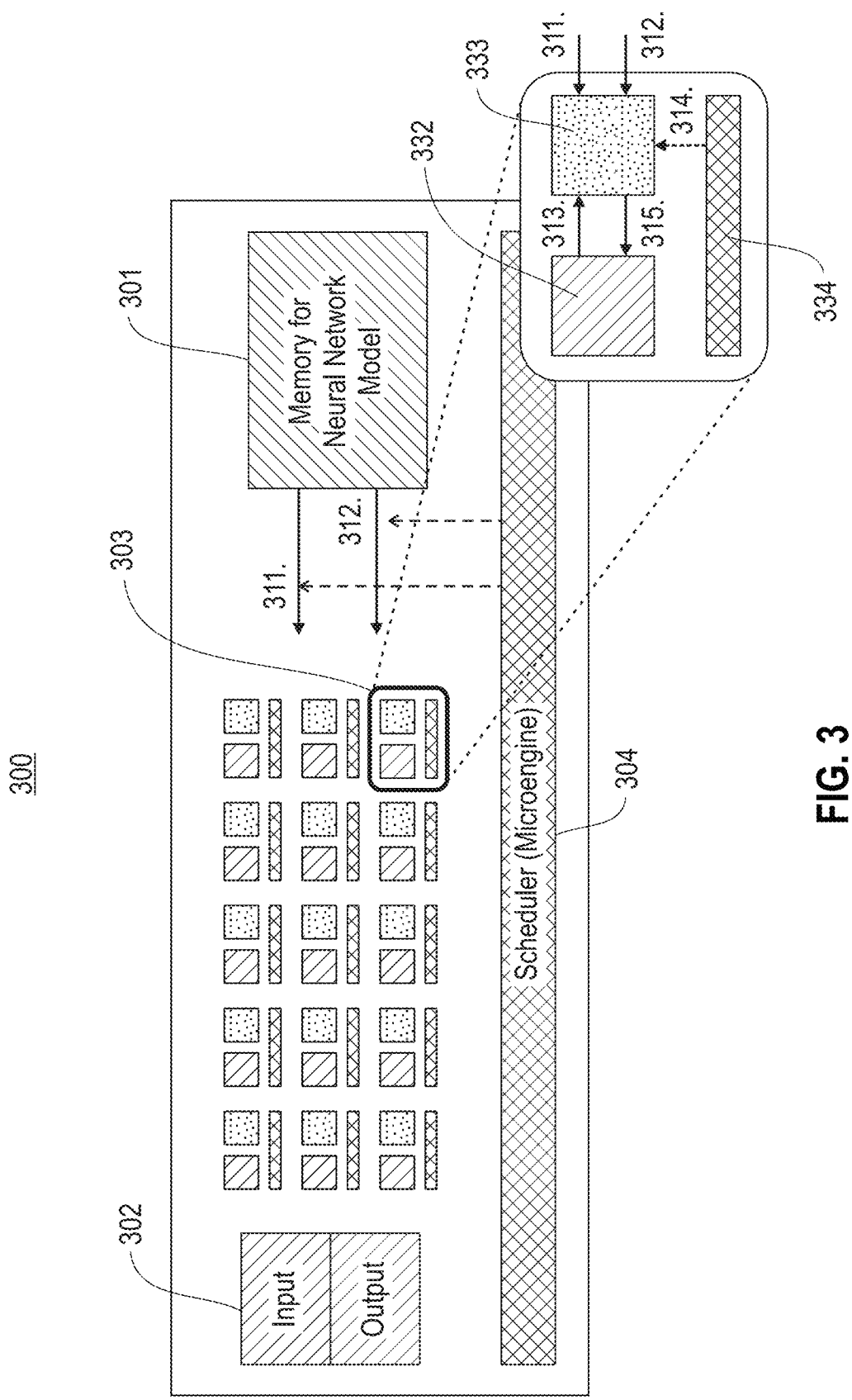
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a model memory 301 for the neural network model. As described above, the neural network model may include the synapse weights for a neural network to be computed. IPU 300 includes an activation memory 302, which may be transient. Activation memory 302 may be divided into input and output regions, and stores neuron activations for processing. In some embodiments, IPU 300 includes an instruction memory 307 for storing chip-level instructions.

IPU 300 includes a plurality of cores 303 in an array 305. Each core 303 includes a neural computation unit 333, which is loaded with a neural network model from model memory 301. Each core also include a local activation memory 332. Input activations are provided from local activation memory 332 in advance of each computation step. Outputs from neural computation unit 333 are written back to activation memory 332 for processing on the same or another neural computation unit.

In various embodiments a global scheduler 304 is included in IPU 300. In various embodiments, a local core controller 334 is included on each core 303. In such embodiments, the direction of operations is shared between the global scheduler (chip microengine) and the local core controller (core microengine). In some embodiments, a chip-level instruction memory 306 is provided for storing chip-level instruction for execution by chip microengine 304. In some embodiments, core 303 includes a core-level instruction memory 336 for storing core-level instructions for execution by core microengine 334.

At 311, compute instructions are loaded from instruction memory 301 to each core 303 by global scheduler 304. At 312, parameters (e.g., neural network/synaptic weights) are loaded from model memory 301 to each core 303 by global scheduler 304. At 313, neural network activation data are loaded from data memory 302 to each core 303 by global scheduler 304. At 314, the cores in matrix 305 perform computation to generate output neuron activations. In particular, the computation comprises applying the input synaptic weights to the input activations. It will be appreciated that various methods are available for performing such computations, including in silico dendrites, as well as vector multiplication units. At 315, the results from computation are stored in data memory 302. These stages may be pipelined, in order to provide efficient usage of the neural computation unit on each core.

It will be appreciated that inputs and outputs may be transferred from local activation memory 332 to global activation memory 302 according to the requirements of a given neural network. Likewise, the model memory and instruction memory may have both chip-level and core-level components. At the core level, at 341, compute instructions are loaded to local instruction memory 336. At 342, parameters (e.g., neural network/synaptic weights) are loaded to model memory 331. At 343, neural network activation data are loaded to data memory 332. At 344, the computation unit 332 computed output activations or partial sums. At 345, the results from computation are outputted from data memory 332. These stages may be pipelined, in order to provide efficient usage of each core.

Figure 4:
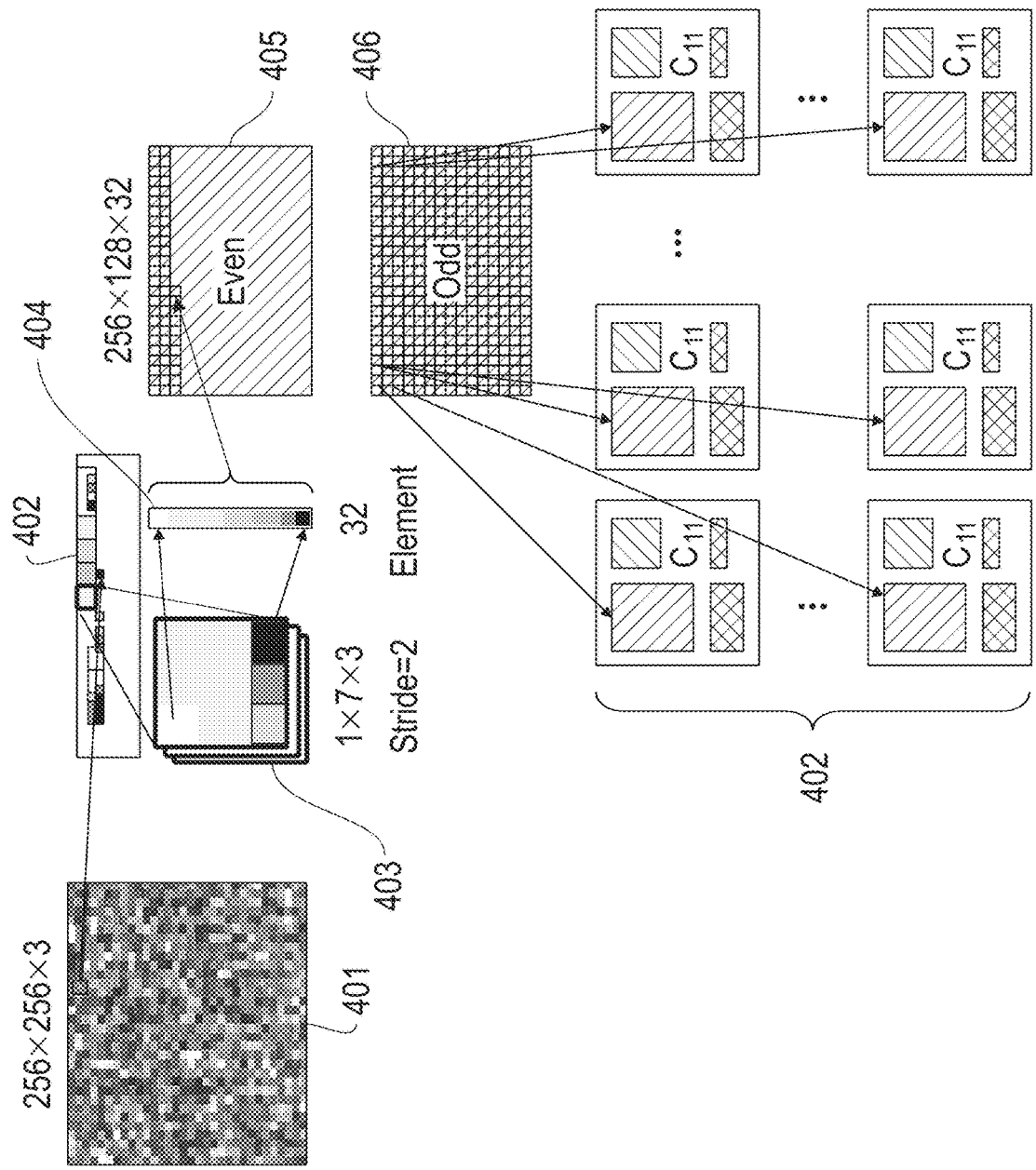
FIG. 4 illustrates transformation according to embodiments of the present disclosure.

With reference now to FIG. 4, transformation is illustrated according to embodiments of the present disclosure. In various embodiments, transformation from high precision to low precision and/or from scalar to vector is provided. In particular, a transformation block can receive high-precision data in various formats and transduce it into a hardware-compatible low-precision representation. Likewise, a transformation block can receive various formats of scalar or vector data and transduce it into a hardware-compatible vector representation.

An input image (e.g., 401) is often 3-color channels (e.g., RGB), each with 8-bits of precision (coding 0-255). If, for example, the hardware uses R bits to represent each activation channel (where R<8), various approaches may be used to cast to R-bit precision.

Each 8-bit value may be cast to an R-bit value by removing the 8-R least significant bits (for example, in cases where all 8 bits of precision are not required).

Each 8-bit value can be cast to 8/R R-bit values (e.g., for R=2, 8/2=4 2-bit values are used).

Each 8-bit value can be cast to less than 8/R R-bit values (e.g., for R=2, 2 2-bit values may be used, dropping the 4 least significant bits).

An input image (e.g., 401) of size W×H×C may be represented as W×H C-element vectors or W×H×C scalars, where W is input width, H is input height, and C is the input number of channels or colors. If, for example, the hardware uses T-element vectors as inputs, there are several ways to cast to T-element vectors.

If T>C, each C-element vector can be directly mapped to a T-element vector with T-C zero entries, resulting in W×H T-element vectors.

If T>C, up to T/C pixels can be packed into each T-element vector. For example, if C=3 and T=24, 8 pixels can be packed, for example into a 4×2 patch with a stride of 4 in width and 2 in height, resulting in W/4×H/2 T-element vectors.

If T>C, up to T/C pixels can be packed into each T-element vector in a manner that optimizes for computation in the next layer. For example, if C=3 and T=24 and the next layer implements a 8×8 convolution with a stride of 4, 8 pixels can be packed, such as a 8×1 patch with a stride of 4, resulting in W/4×H T-element vectors. Now the next layer need only implement a 1×8 convolution across the resulting input, optimizing hardware utilization.

If T<C, each C-element vector can be unpacked into C/T T-element vectors, resulting in W×H×C/T T-element vectors. For example, if C=4 and T=2, each 4-element vector can be unpacked into 2 2-element vectors, resulting in W×H×2 2-element vectors.

In an illustrative example of transformation, input image 401 is 256×256×3, and the underlying hardware uses 4-bit activations and 32-element vectors. Input image 401 is distributed among a 4×4 array of cores 402. To complete a convolution, each core requires a (32+3)×(32+3)×3 portion of original image 401 for a 7×7×3 filter. Using a multiple-row scratch pad memory 402, the 1×7×3(×4) most significant bits 403 are packed into a 21-element vector (of 4 bits per element), which fits within the 32-element platform vector 404. As pictured, a column stride of 2 is used, resulting in some data duplication, but sizing the data for the convolutional layers.

The result of this transformation is that a 7×7×3 filter becomes a 7×1×21 filter. Vector utilization is 21/32≈66%. The packed image tensor 405, 406 is 256×128×32, so each core (in 4×4 array 402) receives a 32×16×32 portion of the tensor (a tensorlet).

As pictured, the input blocks may be double buffered, alternately processing one tensor 405 while sending the prior tensor 406 into core array 402.

It will be appreciated that the example given above is but one potential configuration of the input data tensor. For example, a swatch size of 4×7×1 gives vector utilization of 24.5/32≈77%.

In various embodiments, flexible precision transformation is provided. In an exemplary neural network, each neural network layer computes low precision activations, each represented with R bits, using low precision weights, each represented by S bits. As described above, neurons in a layer receive inputs, X (with elements $x_i$), from one (or more) preceding layers. Each neuron computes its state, Y, based on the input and a set of weights, W (with elements $w_i$), applied to the inputs, where the result is added to a bias and run through a nonlinear activation function, σ. For example, to compute a single neuron activation, $Y=\sigma(b+\Sigma x_i w_i)$.

In the underlying hardware, R bits of precision are used to represent each output and input activation value, given by Y and $x_i$. S bits of precision are used to represent each weight value, given by $w_i$. For a given network structure, each layer may need a different minimum precision to maintain high performance (e.g., classification accuracy). One approach is to build hardware with the maximum precision needed and use that precision for all layers. However, such an approach is inefficient in energy and area. Accordingly, the present disclosure provides an iterative approach that can implement any necessary precision by trading off time for precision.

To increase activation precision beyond R bits, a modified nonlinear activation function is used to first compute the most-significant R bits, zero them (such as by shifting), then compute the next most significant R bits, and repeat. To compute R*M bits of precision would require M steps (which may be pipelined with subsequent operations). The limit of precision is set by the precision of the partial sum before the nonlinearity: $b+\Sigma x_i w_i$.

To increase weight precision beyond S bits, an iterative approach is applied. To compute S*N bits of weight precision, N steps are used. For each step, the partial sum update is computed with S bits, starting with the most significant. After each update, the partial sum, P, is multiplied by (up to) $2^S$ (which can be implemented with a bit shift) to credit the more significant bits appropriately. When P is updated with the least significant S bits it is not multiplied by $2^S$.

For example if S=1 and N=4, the S*N bit precision weight $w_i$ is stored and used as 4 parts: $w_{i\_1}=\lfloor w_i/2^{S*(N-1)}\rfloor$; $w_{i\_2}=\lfloor (w_i-w_{i\_1})/2^{S*(N-2)}\rfloor$; $w_{i\_3}=\lfloor (w_i-w_{i\_1}-w_{i\_2})/2^{S*(N-3)}\rfloor$; $w_{i\_4}=\lfloor (w_i-w_{i\_1}-w_{i\_2}-w_{i\_3})/2^{S*(N-4)}\rfloor$.

The partial sum P is then aggregated as follows across the multiple partial sum computations:

$P=0$

For k=1: N−1 (3 steps in the above example)

$P=P+\Sigma x_i w_{i\_k}$ $P=P*2^S$ $P=P+\Sigma x_i w_{i\_k}$

Accordingly, the present disclosure provides a transcoding circuit that takes in various scalar, vector, matrix, or tensor formats and outputs a tensor format compatible with target underlying neural network hardware. In various embodiments, high-precision data is transduced into low-precision data, compatible with the underlying neural network hardware. In some embodiments, scalar, vector, matrix, or tensor formatted input is transformed into a specific vector, matrix, or tensor format, compatible with the underlying neural network hardware. In various embodiments, flexible precision transformation is provided. In some embodiments, flexible precision transformation is implemented by iterating sequentially.

The present disclosure provides flexible-precision neural network computation by using one or more low-precision compute elements. In some embodiments, flexible precision is achieved with low-precision elements by iterating sequentially.

Figure 5:
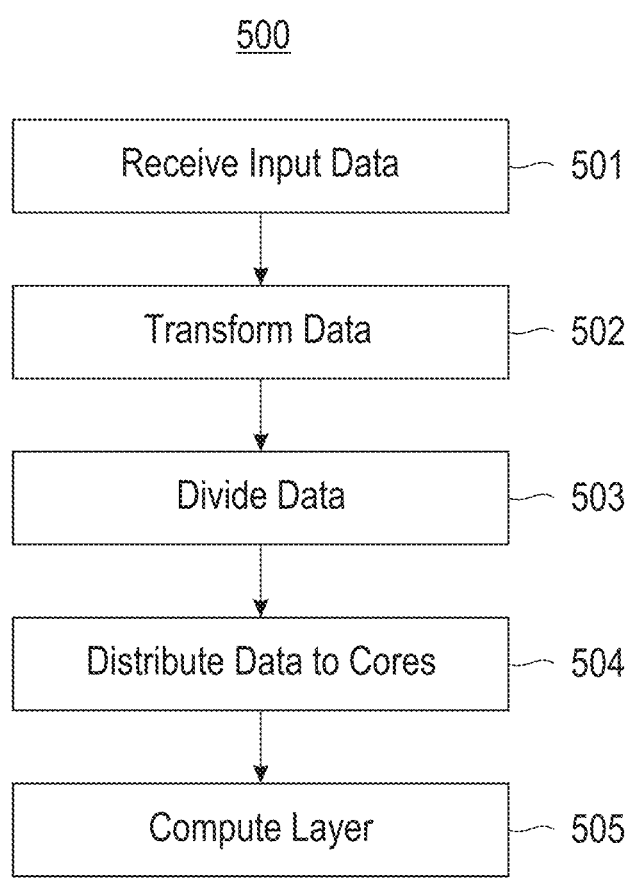
FIG. 5 illustrates a method of operating a neural network according to embodiments of the present disclosure.

Referring now to FIG. 5, a method 500 of operating a neural network is illustrated according to embodiments of the present disclosure. At 501, an input data tensor is received at a neural network processor comprising a plurality of neural cores. The input data tensor has feature dimensions at an input bit precision. The neural network processor is configured for one or more processor feature dimensions at one or more processor bit precisions. At 502, the input data tensor is transformed from the input bit precision to one of the processor bit precisions. At 503, the input data tensor is divided into a plurality of blocks, each block conforming to one of the processor feature dimensions. At 504, each of the plurality of blocks is provided to one of the plurality of neural cores. At 505, the plurality of neural cores computes output of one or more neural network layers.

Figure 6:
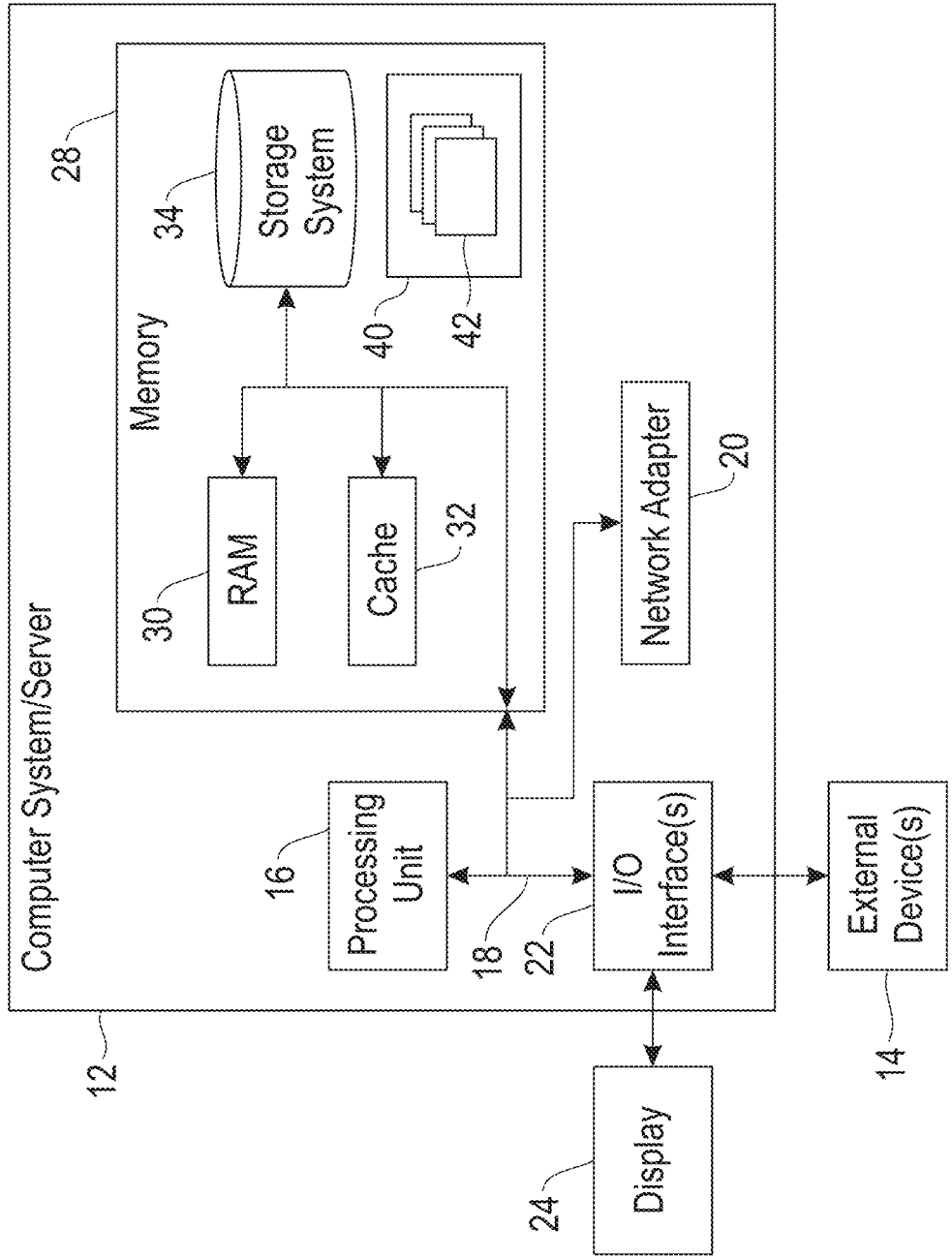
FIG. 6 depicts a computing node according to an embodiment of the present disclosure.

Referring now to FIG. 6, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, tensorlet, block, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
receiving an input data tensor at a neural network processor comprising a plurality of neural cores,
the input data tensor having feature dimensions at an input bit precision,
the neural network processor being configured for one or more feature dimensions at one or more processor bit precisions;
determining a number of blocks by dividing the input bit precision of the input data tensor by one of the one or more processor bit precisions;
determining one of the one or more processor bit precisions;
based on the determination of the one of the one or more processor bit precisions, transforming the input data tensor from the input bit precision to the determined one of the one or more processor bit precisions, wherein transforming the input data tensor comprises removing one or more least significant bits of the input data tensor, wherein a number of the one or more least significant bits is based on the one or more processor bit precisions;
dividing the input data tensor into the number of blocks, each block conforming to one of the feature dimensions of the neural network processor;
providing each of the number of blocks to one of the plurality of neural cores; and
computing, by the plurality of neural cores, output of one or more neural network layers.

2. The method of claim 1, wherein the input data tensor comprises an image.

3. The method of claim 1, the neural network processor being configured for a predetermined number of features, wherein transforming the input data tensor comprises dividing input features into a plurality of feature sets, each having less than or equal to the predetermined number of features.

4. The method of claim 1, wherein dividing the input data tensor comprises zero-padding the number of blocks in one of the feature dimensions of the input data tensor to conform with one of the feature dimensions of the neural network processor.

5. The method of claim 1, wherein dividing the input data tensor comprises packing the input data tensor.

6. The method of claim 5, wherein packing the input data tensor comprises:
reorganizing input features to load unused feature dimensions of the processor with data from non-feature dimensions of the input features.

7. The method of claim 1, wherein the neural network processor is configured to:
compute a plurality of fixed precision partial sums; and
combine the plurality of fixed precision partial sums into complete sums.

8. The method of claim 7, wherein the plurality of fixed precision partial sums are intermediate results.

9. The method of claim 8, wherein the intermediate results are weighted sums of a subset of inputs.

10. The method of claim 7, wherein the neural network processor is configured to iteratively compute a partial sum from the plurality of fixed precision partial sums.

11. A system comprising:
a neural network processor comprising a plurality of neural cores, the neural network processor having one or more processor precisions per activation, the neural network processor being configured to accept data having a feature dimension;
a transformation circuit coupled to the neural network processor, and adapted to:
receive an input data tensor having an input precision per channel at one or more features;
determine one of the one or more processor precisions;
determining a number of blocks by dividing the input bit precision of the input data tensor by one of the one or more processor bit precisions;
based on the determination of the one of the one or more processor precisions, transform the input data tensor from the input precision to the determined one of the one or more processor precisions, wherein transforming the input data tensor comprises removing one or more least significant bits of the input data tensor, wherein a number of the one or more least significant bits is based on the one or more processor bit precisions;
divide the input data tensor into the number of blocks, each block conforming to one of the feature dimensions of the neural network processor; and
provide each of the number of blocks to one of the plurality of neural cores; and wherein
the neural network processor is adapted to compute, by the plurality of neural cores, output of one or more neural network layers.

12. The system of claim 11, wherein the input data tensor comprises an image.

13. The system of claim 11, wherein transforming the input data tensor comprises dividing each channel into a plurality of values having precisions less than or equal to the one of the processor precisions.

14. The system of claim 11, wherein dividing the input data tensor comprises zero-padding the number of blocks in a feature dimension of the input data tensor to conform with one of the feature dimensions of the neural network processor.

15. The system of claim 11, wherein dividing the input data tensor comprises packing the input data tensor.

16. The wherein of claim 15, wherein packing the input data tensor comprises:
reorganizing input features to load unused feature dimensions of the processor with data from non-feature dimensions of the input features.

17. The system of claim 11, wherein the neural network processor is configured to:
compute a plurality of fixed precision partial sums; and
combine the plurality of fixed precision partial sums into complete sums.

18. The system of claim 17, wherein the plurality of fixed precision partial sums are intermediate results.

19. The system of claim 18, wherein the intermediate results are weighted sums of a subset of inputs.

20. The system of claim 17, wherein the neural network processor is configured to iteratively compute a partial sum from the plurality of fixed precision partial sums.

21. A system comprising:
a neural network processor comprising a plurality of neural cores, the neural network processor being configured for one or more feature dimensions at one or more processor bit precisions; and
a transformation circuit coupled to the neural network processor, and adapted to:
receive an input data tensor having feature dimensions at an input bit precision;
determine one of the one or more processor bit precisions;
determining a number of blocks by dividing the input bit precision of the input data tensor by one of the one or more processor bit precisions;
based on the determination of the one of the one or more processor bit precisions, transform the input data tensor from the input bit precision to the determined one of the one or more processor bit precisions, wherein transforming the input data tensor comprises and removing one or more least significant bits of the input data tensor, and wherein a number of the one or more least significant bits is based on the one or more processor bit precisions;
divide the input data tensor into the number of blocks, each block conforming to one of the feature dimensions of the neural network processor; and
provide each of the number of blocks to one of the plurality of neural cores; and wherein the plurality of neural cores is adapted to compute output of one or more neural network layers.

22. A method comprising:
receiving an input data tensor,
  the input data tensor having an input precision per channel at one or more features;
determining a processor precision of a neural network processor;
determining a number of blocks by dividing the input bit precision of the input data tensor by one of the one or more processor bit precisions;
based on the determination of the processor precision, transforming the input data tensor from the input precision to the processor precision of the neural network processor, wherein transforming the input data tensor comprises removing one or more least significant bits of the input data tensor, and wherein a number of the one or more least significant bits is based on the processor precision,
  the neural network processor having a plurality of neural cores;
  the neural network processor being configured to accept data having a feature dimension;
  dividing the input data tensor into the number of blocks, each block conforming to one of the feature dimensions of the neural network processor; and
  providing each of the number of blocks to one of the plurality of neural cores, and wherein the neural network processor is adapted to compute, by the plurality of neural cores, output of one or more neural network layers.

* * * * *